(12) United States Patent
Hayardeny et al.

(10) Patent No.: US 7,085,902 B2
(45) Date of Patent: Aug. 1, 2006

(54) STORAGE SYSTEM WITH SYMMETRICAL MIRRORING

(75) Inventors: Amiram Hayardeny, Binyamina (IL); Avi Teperman, Haifa (IL); Martin Tross, Haifa (IL); Aviad Zlotnick, D.N. Galil Takhton (IL)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 10/673,745

(22) Filed: Sep. 29, 2003

(65) Prior Publication Data
US 2005/0071585 A1    Mar. 31, 2005

(51) Int. Cl.
*G06F 12/16* (2006.01)
(52) U.S. Cl. .................. 711/162; 711/161; 707/204
(58) Field of Classification Search ............... None
See application file for complete search history.

(56) References Cited
U.S. PATENT DOCUMENTS 6,732,124 B1 * 5/2004 Koseki et al. ............ 707/202
6,772,303 B1 * 8/2004 Crockett et al. ........... 711/162
2003/0061240 A1 * 3/2003 McCann et al. ........... 707/200
2003/0154305 A1 * 8/2003 Bethmangalkar et al. ... 709/245
2004/0236984 A1 * 11/2004 Yamasaki ..................... 714/6

OTHER PUBLICATIONS

Ji, Minwen et al., "Seneca: remote mirroring done write", Proceedings of USENIX Technical Conference (San Antonio, TX), pp. 253-268, Jun. 2003. USENIX, Berkeley, CA.

* cited by examiner

*Primary Examiner*—Reginald G. Bragdon
*Assistant Examiner*—Daniel Ko
(74) *Attorney, Agent, or Firm*—Stephen C. Kaufman

(57) ABSTRACT

A method for managing a data storage system includes copying data stored on a first storage subsystem to a second storage subsystem in an asynchronous mirroring process. A record is maintained on the second storage subsystem, indicative of locations at which the data have been updated on the first storage subsystem and have not yet been copied to the second storage subsystem. Upon receiving at the second storage subsystem, from a host processor, a request to access the data stored at a specified location on the data storage system, if the specified location is included in the record, the second storage subsystem initiates a synchronous transfer of the data at the specified location from the first storage subsystem.

66 Claims, 6 Drawing Sheets

STORAGE SYSTEM WITH SYMMETRICAL MIRRORING

CROSS-REFERENCE TO RELATED APPLICATION

This application is related to a U.S. patent application Ser. No. 10/673,733 filed on Sep. 29, 2003, entitled "Storage Disaster Recovery Using a Predicted Superset of Unhardened Primary Data", whose disclosure is incorporated herein by reference.

FIELD OF THE INVENTION

The present invention relates generally to data storage systems, and specifically to data mirroring for failure protection and improving performance of storage systems.

BACKGROUND OF THE INVENTION

Data backup is a standard part of all large-scale computer data storage systems (and most small systems, as well). Data written to a primary storage medium, such as a volume on a local storage subsystem, are copied, or "mirrored," to a backup medium, typically another volume on a remote storage subsystem. The backup volume can then be used for recovery in case a disaster causes the data on the primary medium to be lost. Methods of remote data mirroring are surveyed by Ji et al., in an article entitled "Seneca: Remote Mirroring Done Write," *Proceedings of USENIX Technical Conference* (San Antonio, Tex., June, 2003), pages 253–268, which is incorporated herein by reference. The authors note that design choices for remote mirroring must attempt to satisfy the competing goals of keeping copies as closely synchronized as possible, while delaying foreground writes by host processors to the local storage subsystem as little as possible.

Large-scale storage systems, such as the IBM Enterprise Storage Server (ESS) (IBM Corporation, Armonk, N.Y.), typically offer a number of different copy service functions that can be used for remote mirroring. Among these functions is peer-to-peer remote copy (PPRC), in which a mirror copy of a source volume on a primary storage subsystem is created on a secondary storage subsystem. When an application on a host processor writes to a PPRC volume on the primary subsystem, the corresponding data updates are entered into cache memory and non-volatile storage at the primary subsystem. The control unit (CU) of the primary subsystem then sends the updates over a communication link to the secondary subsystem. When the CU of the secondary subsystem has placed the data in its own cache and non-volatile storage, it acknowledges receipt of the data. The primary subsystem then signals the application that the write operation is complete.

PPRC provides host applications with essentially complete security against single-point failures, since all data are written synchronously to non-volatile media in both the primary and secondary storage subsystems. On the other hand, the need to save all data in non-volatile storage on both subsystems before the host write operation is considered complete can introduce substantial latency into host write operations. In some large-scale storage systems, such as the above-mentioned IBM ESS, this latency is reduced by initially writing data both to cache and to high-speed, non-volatile media, such as non-volatile random access memory (RAM), in both the primary and secondary subsystems. The data are subsequently copied to disk asynchronously (an operation that is also referred to as "hardening" the data) and removed from the non-volatile memory. The large amount of non-volatile memory that must be used for this purpose is very costly.

Data mirroring functions are commonly classified as either "synchronous" or "asynchronous." In synchronous mirroring, all updates (data write operations) are propagated immediately to the secondary subsystem. This is generally the safest mode of operation, but also the slowest, since host writes are not acknowledged until the data have been stored in non-volatile media on both the primary and secondary subsystems. When asynchronous mirroring is used, on the other hand, hosts receive notification from the primary subsystem that a write is complete as soon as the data have been placed in the cache on the primary subsystem (or possibly after the data have been secured in non-volatile storage on the primary subsystem). The updates of the data are read out from the cache and sent to the secondary subsystem in a separate, background operation. The asynchronous approach gives better performance, in terms of response time to host writes, but is vulnerable to partial data loss in the case of failure.

SUMMARY OF THE INVENTION

Data mirroring in a storage system can be useful not only in protecting against failures, but also in reducing the load on the primary storage subsystem by permitting hosts to read data from a secondary storage subsystem on which the data are backed up. This sort of multi-subsystem read functionality can be particularly helpful in improving the performance of distributed applications, in which some hosts may be distant from the primary subsystem but close to the remote secondary subsystem. The secondary subsystem in such a scenario must ensure that the data that it serves to the hosts is synchronized with the data stored on the primary subsystem. Such data synchronization can be assured if host writes to the primary subsystem are synchronously mirrored to the secondary subsystem. As noted above, however, synchronous remote mirroring may add unacceptable latency to host write operations.

Embodiments of the present invention provide methods and systems for asynchronous mirroring that still permit host reads from the secondary storage subsystem with assured data consistency. The distributed read functionality is made possible by a novel metadata record maintained on the secondary subsystem, indicating locations that may contain data that are unsynchronized ("out of sync") with the corresponding locations on primary subsystem. In addition to this "maybe-out-of-sync" record on the secondary subsystem, the primary subsystem maintains an out-of-sync record for use in controlling and tracking the process of data backup to the secondary subsystem. The maybe-out-of-sync record on the secondary subsystem is a superset of the out-of-sync record on the primary subsystem (although in some embodiments, the superset may be equal to the subset). Exemplary methods for maintaining the maybe-out-of-sync record, by means of messaging between the primary and secondary subsystems, are described in the above-mentioned related application Ser. No. 10/673,733.

When a host asks to read data from the secondary subsystem, the secondary subsystem consults its maybe-out-of-sync record to assess whether the location of the data is synchronized with the primary subsystem. If the location in question does not appear in the maybe-out-of-sync record, the secondary subsystem concludes that the location is in sync with the primary subsystem, and serves the read request immediately. Otherwise, if the location is marked in the maybe-out-of-sync record, the secondary subsystem makes a synchronous request to copy the required data from the primary subsystem, in order to synchronize the location with the primary subsystem before serving the host read request. This synchronous copy procedure is transparent to the host file system. To shorten response time to subsequent host reads, the secondary subsystem may sequentially copy data from other out-of-sync locations that are near the location of the current host read request or are otherwise linked to this location.

Because embodiments of the present invention use asynchronous mirroring, the mirroring operations generally add little or no latency to host write operations. On the other hand, since most of the locations on the primary and secondary subsystems are in sync most of the time, host read operations from the secondary subsystem generally proceed with minimal latency, as well. When the location of a requested read appears in the maybe-out-of-sync record, the location is often one that has recently been the object of a write operation on the primary subsystem (which caused the location to become out of sync). In such cases, it is likely that the data to be stored in this location are still in the cache of the primary subsystem, so that the data can be copied rapidly to the secondary subsystem directly from the cache, without the delay of staging data from disk.

In some embodiments of the present invention, the primary and secondary subsystems operate symmetrically. In other words, each of the subsystems serves as the primary subsystem for some hosts and as the secondary subsystem for others. Each of the subsystems is mirrored on the other subsystem in the manner described above. For this purpose, each subsystem maintains a record of locations on the other subsystem that are out of sync with its own data, and a maybe-out-of-sync record, indicating locations at which its own data may be out of sync with more recently-written data on the other subsystem. Each subsystem decides when to convey a data update, due to an input to that subsystem by one of the hosts, to the other subsystem based on its metadata records. This symmetrical configuration provides rapid read and write access for all hosts, regardless of which of the subsystems serves as their primary subsystem, while assuring application data consistency and security against subsystem failures.

There is therefore provided, in accordance with an embodiment of the present invention, a method for managing a data storage system that includes first and second storage subsystems, the method including:

copying data stored on the first storage subsystem to the second storage subsystem in an asynchronous mirroring process;

maintaining a record on the second storage subsystem, indicative of locations at which the data have been updated on the first storage subsystem and have not yet been copied to the second storage subsystem;

receiving at the second storage subsystem, from a host processor, a request to access the data stored at a specified location on the data storage system;

if the specified location is included in the record, sending a message from the second storage subsystem to the first storage subsystem requesting a synchronous update of the data at the specified location; and providing the data stored at the specified location from the second storage subsystem to the host processor after receiving at the second storage subsystem a response to the message from the first storage subsystem.

Typically, the method includes providing the data stored at the specified location from the second storage subsystem to the host processor in response to the request without sending the message if the specified location is not included in the record. Additionally or alternatively, the method includes removing the specified location from the record on the second storage subsystem upon receiving the response from the first storage subsystem.

In some embodiments, the locations included in the record maintained on the second storage subsystem are a superset of the locations at which the data have been updated on the first storage subsystem and have not yet been copied to the second storage subsystem. Typically, maintaining the record includes, upon receiving an update to the data at a given location on the first storage subsystem, sending an instruction from the first storage subsystem to the second storage subsystem, which causes the second storage subsystem to add a plurality of locations, including the given location, to the record. In a disclosed embodiment, sending the instruction includes selecting the plurality of the locations to add to the record responsively to a prediction of the locations at which the data are expected to be updated subsequent to updating the data at the given location.

Additionally or alternatively, maintaining the record includes maintaining a copy of the record on the first storage subsystem, and sending the instruction includes determining whether to send the instruction responsively to the copy of the record. Typically, determining whether to send the instruction includes deciding to send the instruction only if the given location is not included in the record. Further additionally or alternatively, maintaining the record further includes removing the specified location from both the record and the copy of the record responsively to receiving the response from the first storage subsystem at the second storage subsystem.

In a disclosed embodiment, the response from the first storage subsystem includes the data stored at the specified location if the specified location is one of the locations at which the data have been updated on the first storage subsystem and have not yet been copied to the second storage subsystem, and the response otherwise includes a status notification indicating that the data at the specified location on the second storage subsystem are synchronized with the data on the first storage subsystem.

In some embodiments, incorporating the data stored at the specified location in the response from the first storage subsystem to the second storage subsystem, and conveying the data from one or more additional locations on the first storage subsystem to the second storage system responsively to the message from the second storage subsystem. In one embodiment, conveying the data from the additional locations includes selecting the additional locations predictively based on the request from the host processor to access the data stored at the specified location.

In some embodiments, the method includes updating the data that are stored on the second storage subsystem responsively to an input from the host processor, and copying the updated data from the second storage subsystem to the first storage subsystem in the asynchronous mirroring process. In these embodiments, the method typically includes maintaining a further record on the first storage subsystem, indicative of the locations at the which the data have been updated on the second storage subsystem and have not yet been copied to the first storage subsystem; receiving at the first storage subsystem, from a further host processor, a further request to access the data stored at a further location on the data storage system; if the further location is included in the record, sending a further message from the first storage subsystem to the second storage requesting a synchronous update of the data at the further location; and providing the data stored at the further location from the first storage subsystem to the further host processor after receiving at the first storage subsystem the response from the second storage subsystem to the further message. Additionally or alternatively, updating the data includes receiving the data written by the host processor to be stored at a given location on the second storage system, and notifying the first storage system in a synchronous message that the data at the given location have been updated if the given location is not included in the further record on the first storage subsystem.

Typically, copying the data includes transmitting the data between mutually-remote sites over a communication link between the sites. In one embodiment, the sites include first and second mutually-remote sites, at which the first and second storage subsystems are respectively located, and the host processor from which the request is received at the second storage subsystem is located in proximity to the second site, and the method further includes providing the data from the first storage subsystem to a further host processor that is located in proximity to the first site.

In one embodiment, the method includes, upon occurrence of a failure in the second storage subsystem, configuring the first storage subsystem to provide the data directly to the host processor.

Typically, maintaining the record includes marking respective bits in a bitmap corresponding to the locations that are included in the record.

In a further embodiment, the second storage subsystem includes a computer workstation, and wherein maintaining the record and providing the data include maintaining the record and providing the data using an installable file system running on the computer workstation.

There is also provided, in accordance with an embodiment of the present invention, a data storage system, including first and second storage subsystems, which are arranged to store data, wherein the first storage subsystem is arranged to copy the data stored on the first storage subsystem to the second storage subsystem in an asynchronous mirroring process, and wherein the second storage subsystem is arranged to maintain a record indicative of locations at which the data have been updated on the first storage subsystem and have not yet been copied to the second storage subsystem, and wherein the second storage subsystem is further arranged to receive a request from a host processor to access the data stored at a specified location on the data storage system, and if the specified location is included in the record, to send a message to the first storage subsystem requesting a synchronous update of the data at the specified location, and to provide the data stored at the specified location to the host processor after receiving a response to the message from the first storage subsystem.

There is additionally provided, in accordance with an embodiment of the present invention, a computer software product for use in a data storage system including primary and secondary storage subsystems, which are arranged to store data and include respective first and second control units, the product including a computer-readable medium in which program instructions are stored, which instructions, when read by the first and second control units, cause the first control unit to copy the data stored on the first storage subsystem to the second storage subsystem in an asynchronous mirroring process, and wherein the instructions cause the second control unit to maintain a record indicative of locations at which the data have been updated on the first storage subsystem and have not yet been copied to the second storage subsystem, and further cause the second control unit, upon receiving a request from a host processor to access the data stored at a specified location on the data storage system, if the specified location is included in the record, to send a message to the first storage subsystem requesting a synchronous update of the data at the specified location, and to provide the data stored at the specified location to the host processor after receiving a response to the message from the first storage subsystem.

There is further provided, in accordance with an embodiment of the present invention, a method for managing a data storage system that includes first and second storage subsystems, the method including:

copying data stored on the first storage subsystem to the second storage subsystem in an asynchronous mirroring process;

maintaining a record on the second storage subsystem, indicative of locations at which the data have been updated on the first storage subsystem and have not yet been copied to the second storage subsystem;

receiving at the second storage subsystem, from a host processor, a request to access the data stored at a specified location on the data storage system; and if the specified location is included in the record, initiating a synchronous transfer of the data at the specified location from the first storage subsystem.

Typically, the method includes providing the data stored at the specified location from the second storage subsystem to the host processor in response to the request without initiating the synchronous transfer if the specified location is not included in the record.

There is moreover provided, in accordance with an embodiment of the present invention, a method for managing a data storage system that includes first and second storage subsystems, the method including:

storing data on both the first and the second storage subsystems;

receiving first updates to the data at the first storage subsystem, and receiving second updates to the data at the second storage subsystem; and performing a symmetrical mirroring process, so as to copy the first updates from the first storage subsystem to the second storage subsystem, and to copy the second updates from the second storage subsystem to the first storage subsystem.

Typically, performing the symmetrical mirroring process includes copying the updates between the storage subsystems in an asynchronous mirroring process. Receiving the first and second updates typically includes receiving first and second data write requests submitted by host processors to the first and second storage subsystems, respectively.

In a disclosed embodiment, the method includes receiving first and second data requests submitted by first and second host processors to the first and second storage subsystems to access the data stored at first and second locations, respectively, in the data storage system; providing the data from the first storage subsystem to the first host processor after ascertaining that the data stored at the first location on the first storage subsystem are up to date; and providing the data from the second storage subsystem to the second host processor after ascertaining that the data stored at the second location on the second storage subsystem are up to date. Typically, performing the symmetrical mirroring process includes maintaining a respective record on each of the storage subsystems, indicative of locations at which the data have been updated on the other of the storage subsystems and have not yet been copied in the symmetrical mirroring process, and providing the data from the first and second storage subsystems includes determining, responsively to the respective record, whether to request a synchronous update of the data before providing the data to one of the host processors.

There is furthermore provided, in accordance with an embodiment of the present invention, a data storage system, including first and second storage subsystems, which are arranged to store data, wherein the first storage subsystem is arranged to copy the data stored on the first storage subsystem to the second storage subsystem in an asynchronous mirroring process, and wherein the second storage subsystem is arranged to maintain a record indicative of locations at which the data have been updated on the first storage subsystem and have not yet been copied to the second storage subsystem, and wherein the second storage subsystem is further arranged to receive a request from a host processor to access the data stored at a specified location on the data storage system, and if the specified location is included in the record, to initiate a synchronous transfer of the data at the specified location from the first storage subsystem.

There is also provided, in accordance with an embodiment of the present invention, a data storage system, including first and second storage subsystems, which are arranged to store data, wherein the first storage system is arranged to receive first updates to the data, while the second storage system is arranged to receive second updates to the data, and wherein the first and second storage systems are arranged to perform a symmetrical mirroring process, so as to copy the first updates from the first storage subsystem to the second storage subsystem, and to copy the second updates from the second storage subsystem to the first storage subsystem.

There is additionally provided, in accordance with an embodiment of the present invention, a computer software product for use in a data storage system including primary and secondary storage subsystems, which are arranged to store data and include respective first and second control units, the product including a computer-readable medium in which program instructions are stored, which instructions, when read by the first and second control units, cause the first control unit to copy the data stored on the first storage subsystem to the second storage subsystem in an asynchronous mirroring process, and wherein the instructions cause the second control unit to maintain a record indicative of locations at which the data have been updated on the first storage subsystem and have not yet been copied to the second storage subsystem, and further cause the second control unit, upon receiving a request from a host processor to access the data stored at a specified location on the data storage system, if the specified location is included in the record, to initiate a synchronous transfer of the data at the specified location from the first storage subsystem.

There is further provided, in accordance with an embodiment of the present invention, a computer software product for use in a data storage system including primary and secondary storage subsystems, which are arranged to store data and include respective first and second control units, the product including a computer-readable medium in which program instructions are stored, which instructions, when read by the first and second control units, cause the first control unit to receive first updates to the data, and cause the second control unit to receive second updates to the data, and further cause the first and second control units to perform a symmetrical mirroring process, so as to copy the first updates from the first storage subsystem to the second storage subsystem, and to copy the second updates from the second storage subsystem to the first storage subsystem.

The present invention will be more fully understood from the following detailed description of the preferred embodiments thereof, taken together with the drawings in which:

DETAILED DESCRIPTION OF PREFERRED EMBODIMENTS

Figure 1:
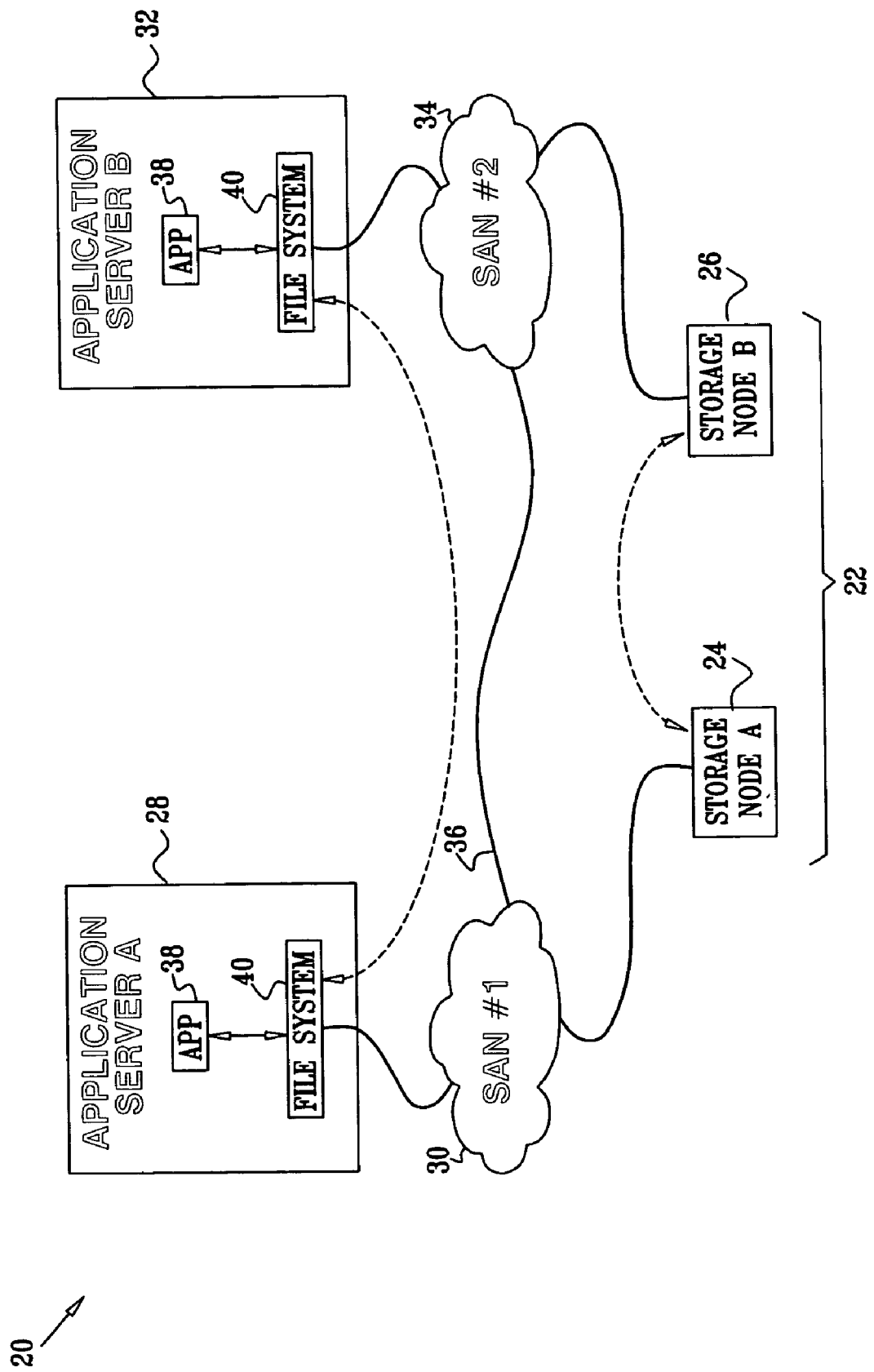
FIG. 1 is a block diagram that schematically illustrates a distributed computing system, in accordance with an embodiment of the present invention.

FIG. 1 is a block diagram that schematically illustrates a distributed computing system 20, in accordance with an embodiment of the present invention. System 20 is based on a distributed storage system 22, which comprises storage subsystems 24 and 26. Subsystems 24 and 26 are labeled "storage node A" and "storage node B" for convenience.

To write and read data to and from storage system 22, a first host computer 28 (referred to alternatively simply as a "host") communicates over a communication link with subsystem 24. Typically, the link is part of a computer network, such as a storage area network (SAN) 30. Alternatively, host 28 may communicate with subsystem 24 over substantially any suitable type of serial or parallel communication link. Data written to subsystem 24 by host 28 are then copied, generally in an asynchronous, background process, over a high-speed link 36 to subsystem 26. For the sake of data security, subsystem 26 is typically located in a site remote from subsystem 24, and is connected to a different SAN 34, which is connected to SAN 30 by link 36. Alternatively, subsystems 24 and 26 may be collocated at the same site and/or may be connected to the same SAN.

Storage system 22 is preferably configured for symmetrical mirroring and distributed service of host computers. Thus, a second host 32, located at or near the site of subsystem 26 in the present example, may write and read data to and from subsystem 26 via SAN 34 or via any other suitable link. The data that are written by host 32 to subsystem 26 are copied in an asynchronous background process over link 36 to subsystem 24. The methods that are used in system 20 to support this sort of symmetrical mirroring and distributed service of hosts 28 and 32 are described in detail hereinbelow. When the sites of SAN 30 and SAN 34 are distant from one another, the performance of the storage system, as perceived by an application 38 running on the hosts, can be substantially enhanced by allowing each host to access the storage subsystem that is closest to the location of the host.

To exemplify the performance enhancement provided by system 20, assume that hosts 28 and 32 are application servers, which run application 38 as a distributed application, wherein each server supports its own local clients (not shown) of the application. When application 38 needs to access data on storage system 22, it submits a read or write request, as appropriate, to a distributed file system 40 via an application program interface (API) provided by the file system. (Although the file system is shown in FIG. 1 as running on hosts 28 and 32, it may alternatively use a separate server for metadata—not shown in the figures—as is known in the art.) File system 40 is responsible for applying the appropriate locks and other controls at the level of files and logical data blocks so that application data consistency is maintained. This file system functionality ensures, inter alia, that no more than one host will be permitted to write to a given location in storage system 22 at any one time. Storage subsystems 24 and 26, on the other hand, are responsible for ensuring that when file system 40 on one of the hosts accesses a certain physical storage location on the local storage subsystem, that location provides the correct data. The methods used for this purpose in storage system 22 are substantially transparent to file system 40.

For the sake of simplicity and clarity, the embodiments described below relate mainly to reading and writing of data by host 28. From this point of view, node A (subsystem 24) is the primary storage subsystem, while node B (subsystem 26) operates as the secondary storage subsystem for purposes of data mirroring. From the point of view of host 32, however, node B is the primary storage subsystem, while node A is the secondary storage subsystem. It should thus be understood that nodes A and B are functionally interchangeable, and that references to one of the storage subsystems in the description that follows are equally applicable, mutatis mutandis, to the other storage subsystem. In case of a failure of subsystem 24, subsystem 26 may take over as the primary subsystem serving host 28 (possibly at the expense of increased latency), and vice versa if a failure occurs in subsystem 26. Although for the sake of simplicity, only a single host 28 or 32 is shown in FIG. 1 as communicating with each of subsystems 24 and 26, each storage subsystem may typically serve multiple hosts. Moreover, although system 22 is shown and described herein as comprising only two storage subsystems 24 and 26, the principles of the present invention may be extended in a straightforward manner to support symmetrical mirroring among three or more storage nodes.

For the purposes of the present invention, subsystems 24 and 26 may comprise substantially any suitable type of storage device known in the art, such as a storage server, SAN disk device or network-attached storage (NAS) device. Subsystems 24 and 26 may even comprise computer workstations, which are configured and programmed to carry out the storage functions described herein. In such embodiments, the data mirroring functions described herein may be implemented, for example, as part of a device driver program used by the workstation to control its hard disk, or as a part of the physical file system running on the workstation. In one embodiment, these data mirroring functions are implemented as part of a Microsoft® Windows® Installable File System (IFS). In this sort of workstation implementation, in fact, the workstation may perform the functions of both the application server and the storage node. In this case, the processes executed by the host CPU in running application 38 and by the storage subsystem control unit may run on the same microprocessor or by different microprocessors in the same box.

Figure 2:
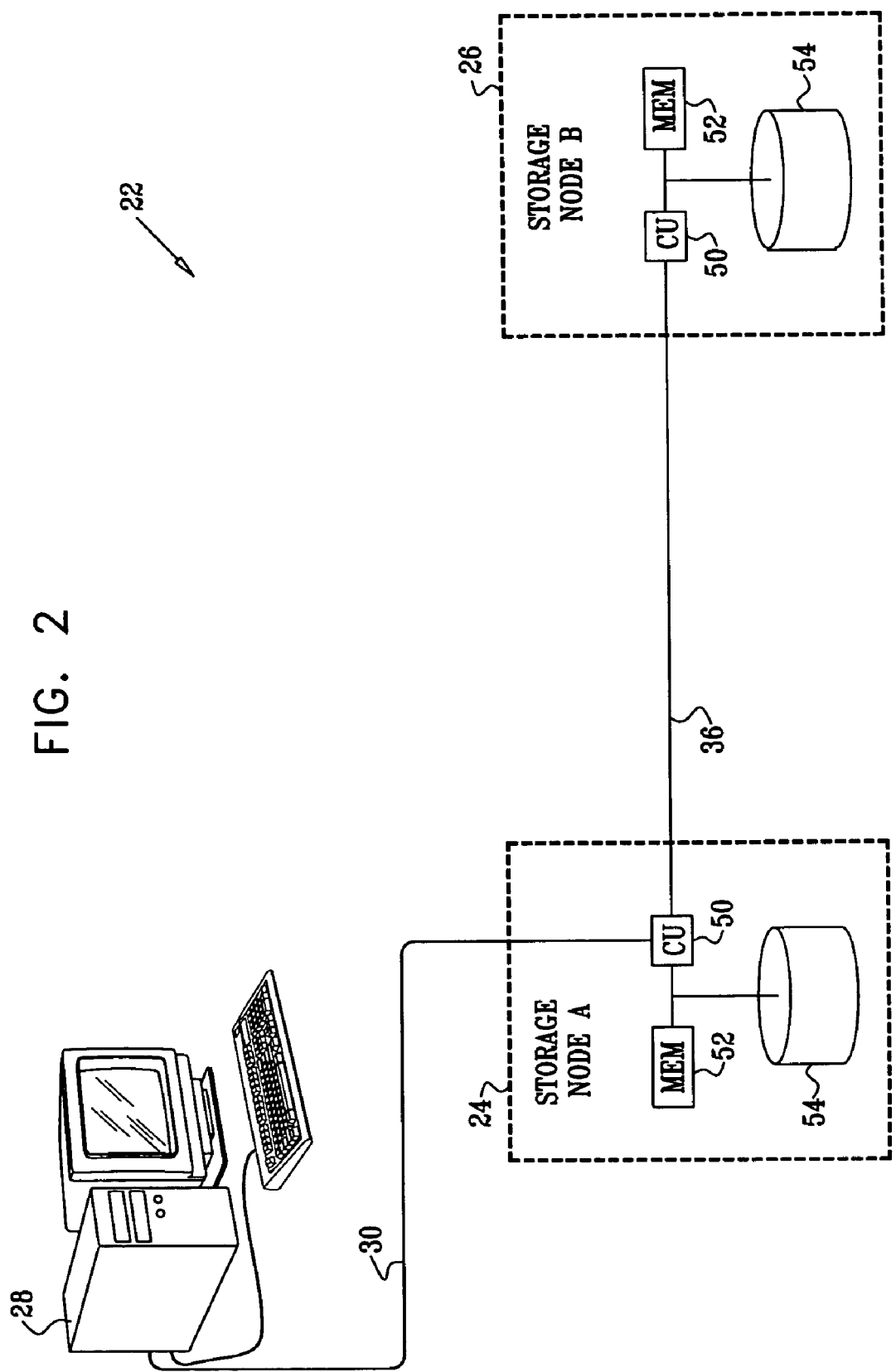
FIG. 2 is a block diagram that schematically shows details of a distributed data storage system, in accordance with an embodiment of the present invention.

FIG. 2 is a block diagram that schematically shows details of storage system 22, in accordance with an embodiment of the present invention. Each of subsystems 24 and 26 in this embodiment comprises a control unit (CU) 50, typically comprising one or more microprocessors, along with a cache 52 and non-volatile storage media 54. Typically, cache 52 comprises volatile random-access memory (RAM), while storage media 54 comprise a magnetic disk or disk array. Alternatively, other types of volatile and non-volatile media, as are known in the art, may be used to carry out the cache and storage functions of subsystems 24 and 26. The term "non-volatile storage media," as used in the context of the present patent application and in the claims, should therefore be understood to comprise collectively any and all of the non-volatile media that are available in a given storage subsystem, while "cache" or "volatile memory" comprises any and all of the volatile media. Control units 50 typically carry out the operations described herein under the control of software, which may be downloaded to subsystems 24 and 26 in electronic form, over a network, for example, or may be provided, alternatively or additionally, on tangible media, such as CD-ROM.

As noted above, subsystems 24 and 26 are typically located at mutually-remote sites, and communicate between themselves over link 36, which may be part of a network or may alternatively be a dedicated line between the two subsystems. Alternatively, control unit 50 and cache 52 of subsystem 26 may be collocated with subsystem 24, while storage media 54 of subsystem 26 are remotely located, as described in a U.S. patent application Ser. No. 10/673,744 entitled "Low-Cost Remote Data Mirroring", filed on Sep. 29, 2003, whose disclosure is incorporated herein by reference.

In the embodiments described below, system 22 is configured for asynchronous data mirroring. In other words, upon receiving data from host 26 to be written to subsystem 24, control unit 50 of subsystem 24 writes the data to cache 52, and then signals the host to acknowledge completion of the write operation without necessarily waiting for the data to be copied to secondary subsystem 26. Control unit 50 stores the data from cache 52 to its local storage media 54 and transmits the data over link 36 to subsystem 26 for mirror (backup) storage by means of background processes. After receiving the data, or possibly after storing the data at the appropriate locations on its own storage media 54, control unit 50 of subsystem 26 sends an acknowledgment back to subsystem 24. The data storage and mirroring operations on system 22 are thus carried out asynchronously and independently of the completion of the write operation between host 26 and subsystem 24.

Figure 3:
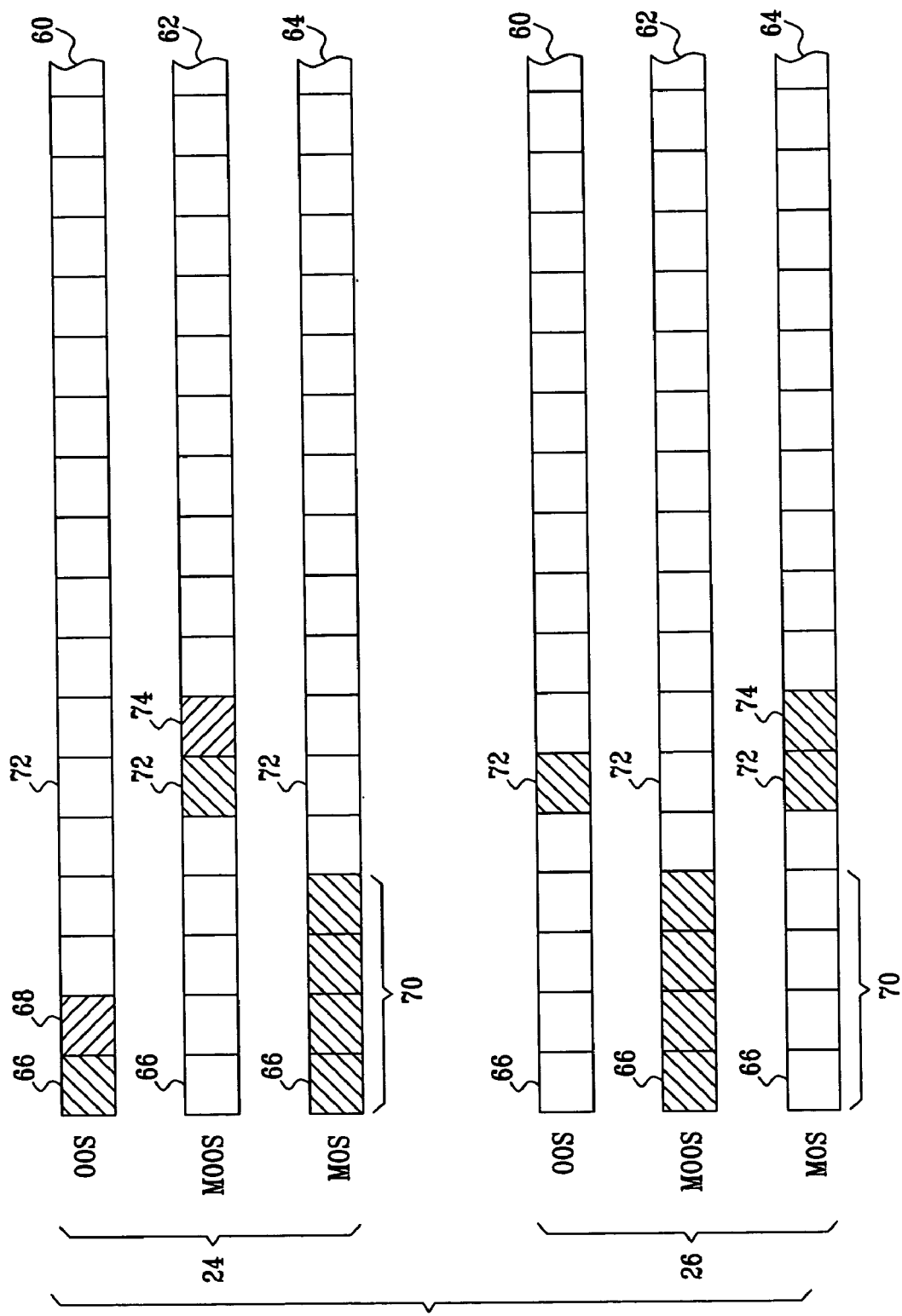
FIG. 3 is a schematic representation of data structures used in tracking data storage, in accordance with an embodiment of the present invention.

FIG. 3 is a schematic representation of data structures that are maintained on subsystems 24 and 26 for tracking data storage in system 22, in accordance with an embodiment of the present invention. These data structures and their use in asynchronous mirroring are described in greater detail in the above-mentioned related application (docket number IL9-2003-0031). They are described briefly here as an aid to understanding the methods of serving host read and write requests that are described below.

Bitmaps 60, 62 and 64, as shown in FIG. 3, are metadata records, which are typically held in volatile memory, such as cache 52, on subsystems 24 and 26. The bitmaps are used in recording the locations at which the data on storage media 54 in subsystems 24 and 26 are or may be out of sync. Each bit represents a different location. Typically, when storage media 54 comprise disks, each bit in the bitmaps corresponds to a disk track. Alternatively, the bits (and the corresponding locations) may correspond to different sorts of data elements, of finer or coarser granularity. Furthermore, although the bitmaps described here are a convenient means for maintaining metadata records, other types of data structures may similarly be used for the purposes of the present invention, as will be apparent to those skilled in the art.

The specific purposes of the bitmaps shown in FIG. 3 are as follows:

Bitmap 60 on subsystem 24 indicates locations at which the data held by subsystem 26 (in cache 32 or storage media 34) are out of sync with the corresponding locations in the cache or storage media in subsystem 24. In other words, these are locations at which subsystem 24 has received updated data from host 28, but has not yet copied the data to subsystem 26. Thus, when control unit 50 of subsystem 24 signals host 28 to acknowledge a write operation to a specified track before having sent the data over link 36 to subsystem 26, the control unit sets the bit corresponding to this track in bitmap 60. The control unit then sends the data to subsystem 26, and clears the bit when it receives an acknowledgment from subsystem 26 that the data have been received there. Bitmap 60 is therefore referred to as the "out-of-sync" (OOS) bitmap. Bitmap 60 on subsystem 26 likewise indicates tracks for which subsystem 26 has received write data that have not yet been copied to subsystem 24.

Bitmap 62 on subsystem 24 contains a superset of the bits set in bitmap 60 on subsystem 26. This bitmap typically indicates both locations that are known to be out of sync with subsystem 26 and locations that are not currently out of sync, but to which host 32 is expected to write in the near future. Similarly, bitmap 62 on subsystem 26 contains a predictive superset of the bits set in bitmap 60 on subsystem 24. Bitmap 62 is therefore referred to as the "maybe-out-of-sync" (MOOS) bitmap. Typically, bits are set in bitmap 62 on subsystem 24 in response to instructions conveyed in a message from subsystem 26 following a host write to subsystem 26, and vice versa, as described below with reference to FIG. 5A. In order to avoid the communication overhead of instructing the secondary subsystem to update bitmap 62 every time the primary subsystem receives a host write, the control units use a predictive method to select a number of bits in bitmap 62 to set at the same time.

Bitmap 64 on subsystem 24 is a copy of bitmap 62 on subsystem 26, and vice versa. In other words, when control unit 50 of subsystem 24 instructs subsystem 26 to set certain bits in bitmap 62 on subsystem 26, the control unit also sets the corresponding bits in bitmap 64 on subsystem 24. Thus, all bits that are set in bitmap 64 on subsystem 24 are also set by control unit 50 of subsystem 26 in its MOOS bitmap 62. Bitmap 64 is therefore referred to as the "marked-on-secondary" (MOS) bitmap. A given bit may be set in either of bitmaps 62 and 64 on subsystem 24 (and similarly on subsystem 26), but not in both bitmaps.

By way of example, as shown by the hatching in FIG. 3, certain bits 66, 68, 70, 72 and 74 are set in bitmaps 60, 62 and 64. These bits are referred to below in the description of methods for serving host read and write requests that are illustrated in FIGS. 4, 5A and 5B.

Typically, control units 30 of subsystems 24 and 26 maintain additional records, such as a cache bitmap showing "dirty" locations in the respective cache 52 on subsystem 22, i.e., cache locations to which a host has written data that have not yet been hardened to storage media 54. These additional records are used by the control units in maintaining bitmaps 60, 62 and 64 and in determining which data to copy from one subsystem to the other as described in the related application Ser. No. 10/673,733.

Figure 4:
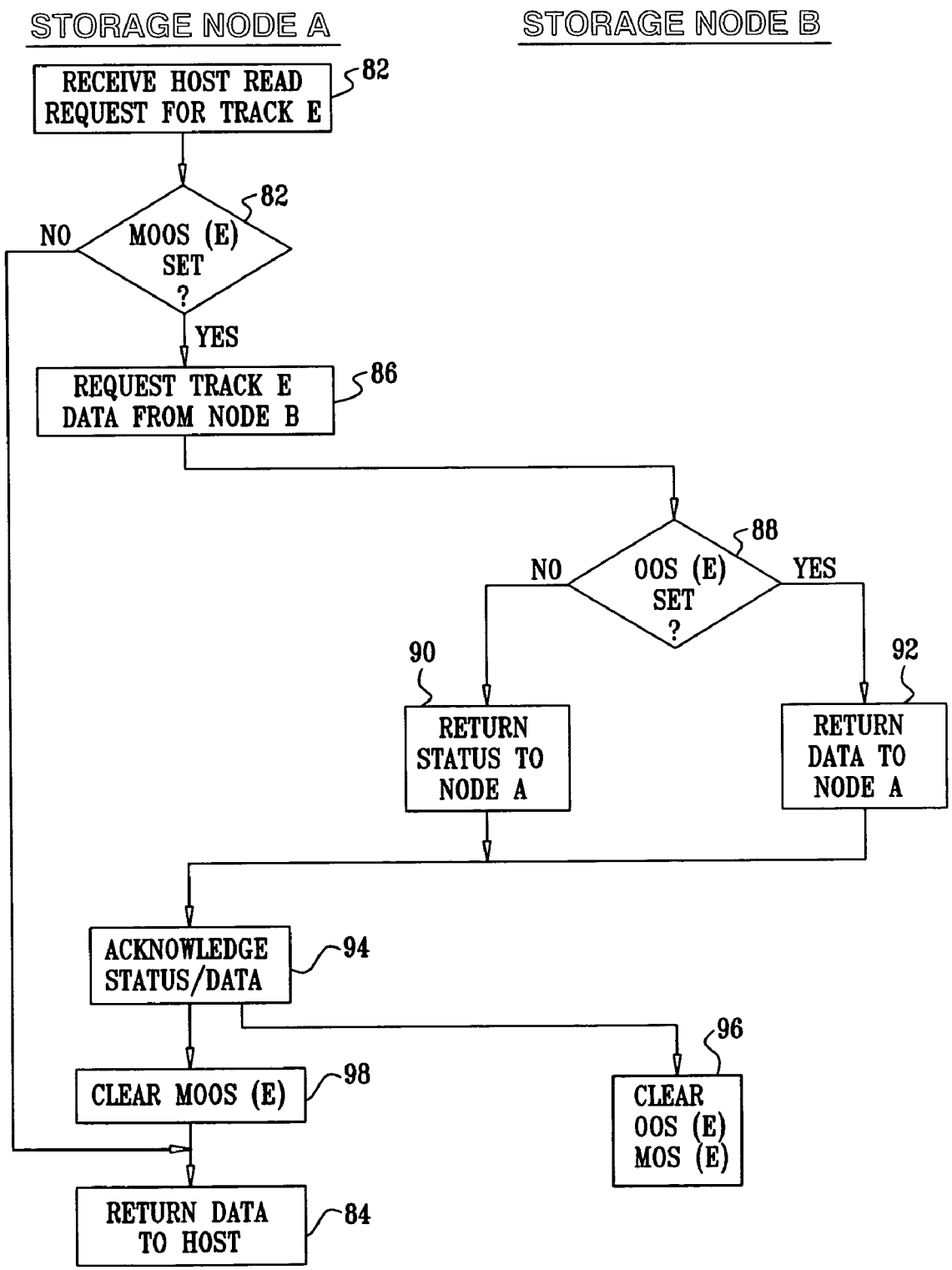
FIG. 4 is a flow chart that schematically illustrates a method for serving a host read request, in accordance with an embodiment of the present invention.
Figure 5A:
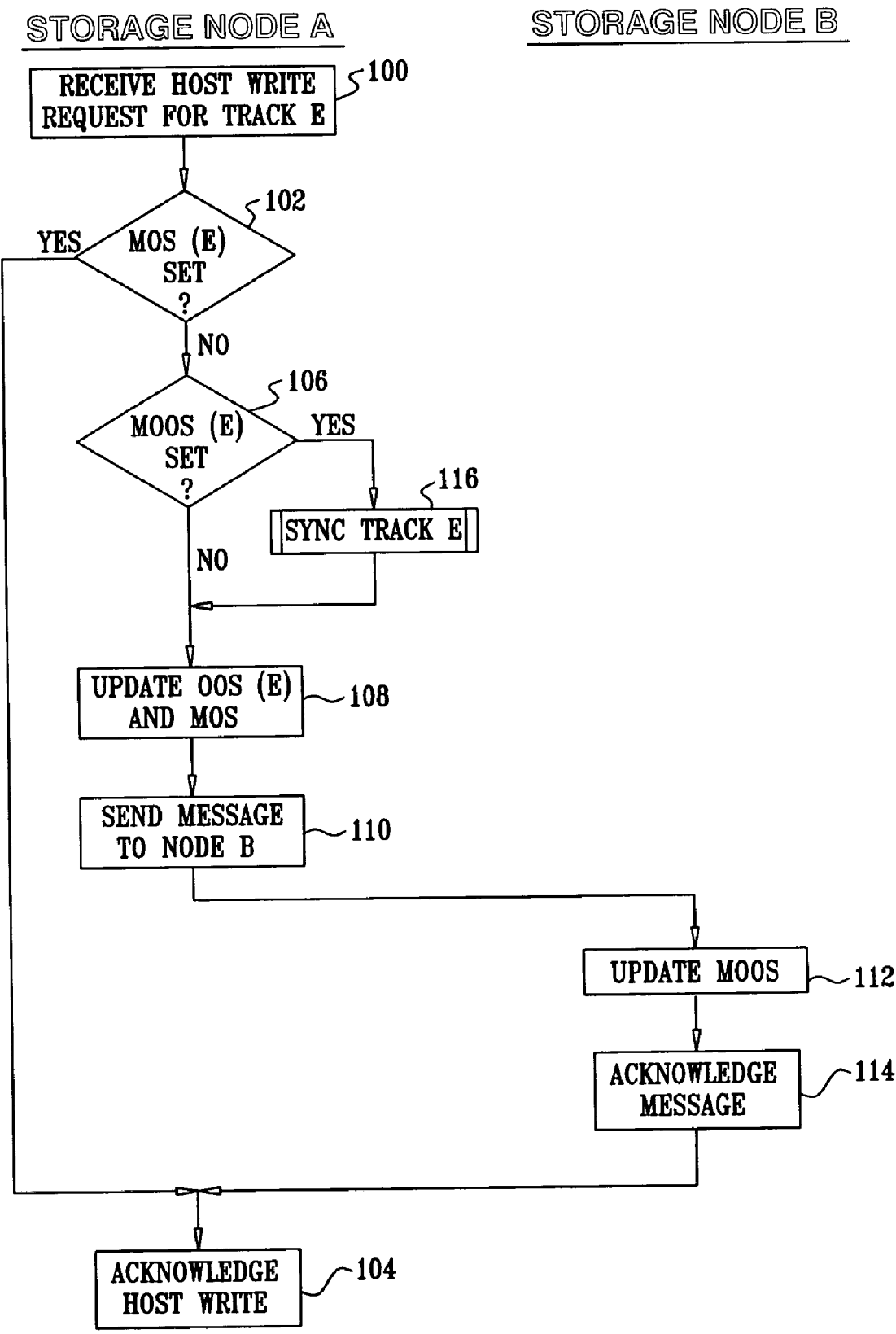
FIGS. 5A and 5B are flow charts that schematically illustrate a method for serving a host write request, in accordance with an embodiment of the present invention.
Figure 5B:
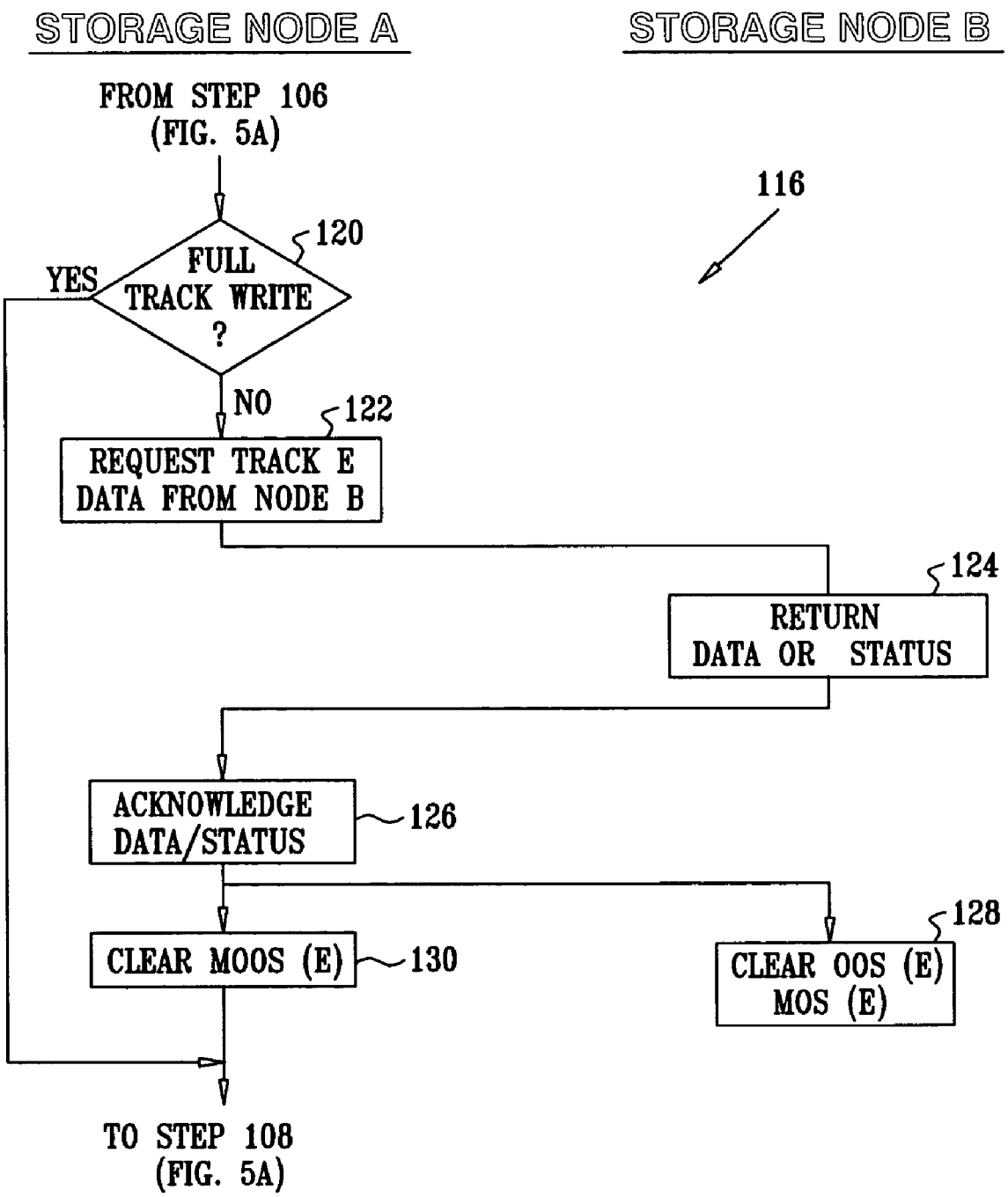

FIG. 4 is a flow chart that schematically illustrates a method for serving a host read request, in accordance with an embodiment of the present invention. The method is initiated, in the present example, when subsystem 24 receives a request from host 28 to read data from a certain track on storage media 54, at a read request step 80. The requested track is referred to hereinafter as "track E." Control unit 50 of subsystem 24 checks the status of the bit corresponding to the requested track in bitmap 62, referred to as MOOS (E), at a MOOS checking step 82. If this bit is set, it means that subsystem 24 has set the bit, following a communication from subsystem 26, because subsystem 26 may have newer data in this track than does subsystem 24. On the other hand, if MOOS (E) is clear, it means that subsystem 24 is holding the most up-to-date copy of the data in track E. Therefore, in this latter case, subsystem 24 simply returns the requested data to host 28, at a data service step 84.

If MOOS (E) is found at step 82 to be set, however, control unit 50 of subsystem 24 must request the data in track E from subsystem 26, at a copy request step 86. (Alternatively, in at least some cases, the control unit of subsystem 24 may instruct host 28 to request the data directly from subsystem 26, causing a synchronous transfer of the data from subsystem 26 to the host.) Upon receiving the copy request, the control unit of subsystem 26 checks its own OOS bitmap 60, at an OOS checking step 88. If OOS (E) is set on subsystem 26, it means that subsystem 26 is holding new data in track E that has not yet been copied to subsystem 24. This is the case, or example, with respect to the track corresponding to bit 72, which is marked in both MOOS bitmap 62 on subsystem 24 and in OOS bitmap 60 on subsystem 26. Therefore, in this case, subsystem 26 returns the requested data to subsystem 24, at a data return step 92.

On the other hand, because the bits set in MOOS bitmap 62 on subsystem 24 are a superset of the bits set in OOS bitmap 60 on subsystem 26, control unit 50 of subsystem 26 may find at step 88 that OOS (E) is clear. This is the case with respect to bit 74. In this case, the data in track E on subsystem 24 are already synchronized with subsystem 26, and there is no need to transfer the data over link 36. Instead, subsystem 26 simply sends a status message to subsystem 24, at a status return step 90.

Upon receiving the message sent by subsystem 26 at step 90 or 92, subsystem 24 returns an acknowledgment to subsystem 26, at an acknowledgment step 94. Upon receiving this acknowledgment, the control unit of subsystem 26 updates its OOS and MOS bitmaps 60 and 64, at a bitmap update step 96. If OOS (E) was set on subsystem 26, the control unit clears this bit, since the corresponding track is now synchronized. In addition, the control unit clears MOS (E). Meanwhile, the control unit on subsystem 24 clears the corresponding bit, MOOS (E), in its own bitmap 62, at a MOOS clearing step 98. Once these operations are complete, subsystem 24 returns the requested data to host 28, at step 84.

After control unit 50 of subsystem 26 has transmitted the contents of track E to subsystem 24 at step 92, it may continue subsequently to transmit the contents of a number of other tracks that are currently out of sync (i.e., marked in bitmap 60). Typically, the control unit selects other tracks that are likely to be requested next by subsystem 24, such as tracks that are in proximity to the requested track. Additionally or alternatively, the control unit may employ object-based storage techniques to track the storage locations that are out of sync and to predict the locations from which host 28 is likely to read next. In object-based storage, the control unit is aware of the association between storage locations and logical objects. For instance, if the logical objects are pages written in Hypertext Markup Language (HTML), the control unit may, after copying data to subsystem 24 from a first HTML page, copy data from other HTML pages to which the first page has hyperlinks. In any case, as a result of copying data in this manner in anticipation of subsequent data requests by subsystem 24, the latency of subsystem 24 in serving subsequent read requests by host 28 may be reduced. Control unit 50 of subsystem 26 may autonomously select the tracks to copy to subsystem 24 as part of its ongoing background copying function, or alternatively or additionally, the control unit of subsystem 24 may prompt subsystem 26 for certain desired tracks.

FIG. 5A is a flow chart that schematically illustrates a method for serving a host write request, in accordance with an embodiment of the present invention. This method is initiated when host 28 attempts to write data to track E on subsystem 24, at a write request step 100. The control unit of subsystem 24 places the data written by the host in cache 52, from which the data are typically destaged asynchronously to storage media 54. Control unit 50 of subsystem 24 checks its MOS bitmap 64, to determine whether MOS(E) is set, at a MOS checking step 102. If MOS(E) is set, it means that the corresponding bit MOOS(E) is already set, as well, in subsystem 26. Consequently, subsystem 26 will not serve a read or write request (from host 32, for example), without first receiving a copy of the data in track E from subsystem 24. Therefore, when MOS(E) is set, control unit 50 of subsystem 24 may safely signal acknowledgment to host 28 that the write has been successfully completed, at a write acknowledge step 104, without the need for any synchronous communication with subsystem 26 at this point.

Control unit 50 in subsystem 24 sets OOS(E) in bitmap 60 at step 104, to indicate that the data in track E are now out of sync with subsystem 26. The data in this track are subsequently copied to subsystem 26 in an asynchronous background process (unless subsystem 26 requests a synchronous copy of the data, as at step 86 in FIG. 4, for example). After the data have been copied to subsystem 26, the corresponding bits in bitmaps 60 and 64 on subsystem 24 and in bitmap 62 on subsystem 26 are cleared. Efficient methods for use in clearing the bits in these bitmaps are described in the related application Ser. No. 10/673,733.

Returning now to step 102, if MOS(E) is clear, control unit 50 of subsystem 24 next checks whether MOOS(E) is set in bitmap 62, at a MOOS checking step 106. If MOOS(E) is also clear, the control unit may conclude that subsystem 24 is currently holding the most up-to-date copy of the data in track E, and the host write operation may be allowed to proceed. Before completing the write operation, however, the control unit updates bitmaps 60 and 64, at a bitmap update step 108. The control unit sets OOS(E), for example, bit 66 in OOS bitmap 60, and selects a number of bits, such as bits 70, to be set in MOS bitmap 64, as shown in FIG. 2. In the present example, the control unit selects bits MOS(E) through MOS(E+N), with N=3. (Preferably, the control unit actually sets these bits in the MOS bitmap only after receiving an acknowledgment from subsystem 26, as described below at step 114.) Thereafter, if subsystem 24 receives a request from host 28 to write data to the track corresponding to bit 68, the control unit will determine at step 102 that the MOS bit for this track is already set, and the write operation will proceed to step 104 without delay. A larger or smaller number of bits in MOS bitmap 64, following and/or preceding bit E, may be set for this purpose at step 108. Alternatively, the control unit may apply an object-based storage criterion, as described above, in selecting the bits that are to be set in MOS bitmap 64 at this step.

Control unit 50 of subsystem 24 sends a message to subsystem 26, indicating that a data write to track E has taken place, at a messaging step 110. As described in the parent application, this message may optionally include the new data that host 28 has written to subsystem 24 at step 100 (in which case OOS (E) is not set at step 108). Upon receiving the message from subsystem 24, the control unit of subsystem 26 updates its own MOOS bitmap 62, setting the same bits in bitmap 62 as were set in MOS bitmap 64 of subsystem 24 at step 108. In this case, as shown in FIG. 2, bits 70 are set in MOOS bitmap 62 on subsystem 26. Subsystem 26 then returns an acknowledgment to subsystem 24, indicating that the MOOS bitmap has been updated, at a message acknowledgment step 114. Upon receiving the acknowledgment, control unit 50 of subsystem 24 signals host 28 that the write operation has been completed, at step 104.

Returning now to step 106, if control unit 50 of subsystem 24 finds that MOOS(E) is set for the track requested by host 28 for write at step 100, it means that subsystem 26 may be holding a more up-to-date copy of the data in this track than is currently held on subsystem 24. In this case, the control unit must deal with synchronization of this track, in a synchronization procedure 116, before allowing the write operation to proceed.

FIG. 5B is a flow chart that schematically illustrates synchronization procedure 116, in accordance with an embodiment of the present invention. Control unit 50 of subsystem 24 first checks whether the data submitted by host 28 at step 100 will write over the entire contents of track E, at a full track checking step 120. If this is the case, then there is no need for subsystem 24 to receive a synchronized copy of the contents of the track from subsystem 26, since the contents will all be overwritten anyway. (It is assumed that file system 40, as shown in FIG. 1, will prevent host 28 from overwriting the track unless the host has acquired the necessary locks and permissions.) Thus, in the case of a full-track write, the method of FIG. 5A continues at step 108 without interruption for track synchronization.

If the write covers only part of track E, however, control unit 50 of subsystem 24 requests the data contents of the track from subsystem 26, at a copy request step 122. This step is similar to step 86 (FIG. 4). Subsystem 26 similarly responds with the requested data or with a status message, at a response step 124, in a manner similar to that described above with reference to steps 88, 90 and 92. Upon receiving the response from subsystem 26, the control unit of subsystem 24 returns an acknowledgment to subsystem 26, at a response acknowledgment step 126, and clears MOOS(E) in its bitmap 62, at a MOOS clearing step 130. The acknowledgment from subsystem 24 causes control unit 50 of subsystem 26 to clear OOS(E) and MOS(E) in its own bitmaps 60 and 64, at a bitmap update step 128. Subsystem 24 may then complete the host write operation, continuing from step 108.

As an alternative to procedure 116 as shown in FIG. 5B, control unit 50 of subsystem 24 may simply pass the host write request on to subsystem 26 for service, as though the write request were addressed to subsystem 26 from the start.

As noted earlier, although the methods shown in FIGS. 4, 5A and 5B above refer to read and write operations directed to subsystem 24, similar read and write operations may be directed at any time to subsystem 26. These operations will be handled by subsystem 26 using the methods described above, with the roles of "storage node A" and "storage node B" interchanged between the storage subsystems. Alternatively, one of the storage subsystems may be configured as a read-only node, so that all write operations are directed to the other storage subsystem.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for managing a data storage system that includes first and second storage subsystems, the method comprising:
    copying data stored on the first storage subsystem to the second storage subsystem in an asynchronous mirroring process;
    maintaining a record on the second storage subsystem, indicative of locations at which the data have been updated on the first storage subsystem and have not yet been copied to the second storage subsystem;
    receiving at the second storage subsystem, from a host processor, a request to access the data stored at a specified location on the data storage system;
    if the specified location is included in the record, sending a message from the second storage subsystem to the first storage subsystem requesting a synchronous update of the data at the specified location; and
    providing the data stored at the specified location from the second storage subsystem to the host processor after receiving at the second storage subsystem a response to the message from the first storage subsystem.

2. The method according to claim 1, and comprising providing the data stored at the specified location from the second storage subsystem to the host processor in response to the request without sending the message if the specified location is not included in the record.

3. The method according to claim 1, and comprising removing the specified location from the record on the second storage subsystem upon receiving the response from the first storage subsystem.

4. The method according to claim 1, wherein the locations included in the record maintained on the second storage subsystem are a superset of the locations at which the data have been updated on the first storage subsystem and have not yet been copied to the second storage subsystem.

5. The method according to claim 4, wherein maintaining the record comprises, upon receiving an update to the data at a given location on the first storage subsystem, sending an instruction from the first storage subsystem to the second storage subsystem, which causes the second storage subsystem to add a plurality of locations, including the given location, to the record.

6. The method according to claim 5, wherein sending the instruction comprises selecting the plurality of the locations to add to the record responsively to a prediction of the locations at which the data are expected to be updated subsequent to updating the data at the given location.

7. The method according to claim 5, wherein maintaining the record comprises maintaining a copy of the record on the first storage subsystem, and wherein sending the instruction comprises determining whether to send the instruction responsively to the copy of the record.

8. The method according to claim 7, wherein determining whether to send the instruction comprises deciding to send the instruction only if the given location is not included in the record.

9. The method according to claim 7, wherein maintaining the record further comprises removing the specified location from both the record and the copy of the record responsively to receiving the response from the first storage subsystem at the second storage subsystem.

10. The method according to claim 4, wherein the response from the first storage subsystem comprises the data stored at the specified location if the specified location is one of the locations at which the data have been updated on the first storage subsystem and have not yet been copied to the second storage subsystem, and wherein the response otherwise comprises a status notification indicating that the data at the specified location on the second storage subsystem are synchronized with the data on the first storage subsystem.

11. The method according to claim 1, and comprising incorporating the data stored at the specified location in the response from the first storage subsystem to the second storage subsystem, and conveying the data from one or more additional locations on the first storage subsystem to the second storage system responsively to the message from the second storage subsystem.

12. The method according to claim 11, wherein conveying the data from the additional locations comprises selecting the additional locations predictively based on the request from the host processor to access the data stored at the specified location.

13. The method according to claim 1, and comprising updating the data that are stored on the second storage subsystem responsively to an input from the host processor, and copying the updated data from the second storage subsystem to the first storage subsystem in the asynchronous mirroring process.

14. The method according to claim 13, and comprising:
    maintaining a further record on the first storage subsystem, indicative of the locations at the which the data have been updated on the second storage subsystem and have not yet been copied to the first storage subsystem;
    receiving at the first storage subsystem, from a further host processor, a further request to access the data stored at a further location on the data storage system;
    if the further location is included in the record, sending a further message from the first storage subsystem to the second storage requesting a synchronous update of the data at the further location; and
    providing the data stored at the further location from the first storage subsystem to the further host processor after receiving at the first storage subsystem the response from the second storage subsystem to the further message.

15. The method according to claim 14, wherein updating the data comprises receiving the data written by the host processor to be stored at a given location on the second storage system, and notifying the first storage system in a synchronous message that the data at the given location have been updated if the given location is not included in the further record on the first storage subsystem.

16. The method according to claim 1, wherein copying the data comprises transmitting the data between mutually-remote sites over a communication link between the sites.

17. The method according to claim 16, wherein the sites comprise first and second mutually-remote sites, at which the first and second storage subsystems are respectively located, and wherein the host processor from which the request is received at the second storage subsystem is located in proximity to the second site, and the method further comprises providing the data from the first storage subsystem to a further host processor that is located in proximity to the first site.

18. The method according to claim 1, and comprising, upon occurrence of a failure in the second storage subsystem, configuring the first storage subsystem to provide the data directly to the host processor.

19. The method according to claim 1, wherein maintaining the record comprises marking respective bits in a bitmap corresponding to the locations that are included in the record.

20. The method according to claim 1, wherein the second storage subsystem comprises a computer workstation, and wherein maintaining the record and providing the data comprise maintaining the record and providing the data using an installable file system running on the computer workstation.

21. A data storage system, comprising first and second storage subsystems, which are arranged to store data,
wherein the first storage subsystem is arranged to copy the data stored on the first storage subsystem to the second storage subsystem in an asynchronous mirroring process, and
wherein the second storage subsystem is arranged to maintain a record indicative of locations at which the data have been updated on the first storage subsystem and have not yet been copied to the second storage subsystem, and
wherein the second storage subsystem is further arranged to receive a request from a host processor to access the data stored at a specified location on the data storage system, and if the specified location is included in the record, to send a message to the first storage subsystem requesting a synchronous update of the data at the specified location, and to provide the data stored at the specified location to the host processor after receiving a response to the message from the first storage subsystem.

22. The system according to claim 21, wherein the second storage subsystem is arranged to provide the data stored at the specified location to the host processor in response to the request without sending the message if the specified location is not included in the record.

23. The system according to claim 21, wherein the second storage subsystem is arranged to remove the specified location from the record upon receiving the response from the first storage subsystem.

24. The system according to claim 21, wherein the locations included in the record maintained on the second storage subsystem are a superset of the locations at which the data have been updated on the first storage subsystem and have not yet been copied to the second storage subsystem.

25. The system according to claim 24, wherein the first storage subsystem is arranged, upon receiving an update to the data at a given location, to send an instruction to the second storage subsystem, which causes the second storage subsystem to add a plurality of locations, including the given location, to the record.

26. The system according to claim 25, wherein the plurality of the locations to add to the record are selected responsively to a prediction of the locations at which the data are expected to be updated subsequent to updating the data at the given location.

27. The system according to claim 25, wherein the first storage subsystem is arranged to maintain a copy of the record, and to determine whether to send the instruction responsively to the copy of the record.

28. The system according to claim 27, wherein the first storage subsystem is arranged to send the instruction only if the given location is not included in the record.

29. The system according to claim 27, wherein the first and second storage subsystems are arranged to remove the specified location from both the record and the copy of the record responsively to receiving the response from the first storage subsystem at the second storage subsystem.

30. The system according to claim 24, wherein the response from the first storage subsystem comprises the data stored at the specified location if the specified location is one of the locations at which the data have been updated on the first storage subsystem and have not yet been copied to the second storage subsystem, and wherein the response otherwise comprises a status notification indicating that the data at the specified location on the second storage subsystem are synchronized with the data on the first storage subsystem.

31. The system according to claim 21, wherein the first storage subsystem is arranged to send the response incorporating the data stored at the specified location, and to convey the data from one or more additional locations on the first storage subsystem to the second storage system responsively to the message from the second storage subsystem.

32. The system according to claim 31, wherein the first storage subsystem is arranged to select the additional locations predictively based on the request from the host processor to access the data stored at the specified location.

33. The system according to claim 21, wherein the second storage subsystem is arranged to update the data that are stored on the second storage subsystem responsively to an input from the host processor, and to copy the updated data to the first storage subsystem in the asynchronous mirroring process.

34. The system according to claim 33, wherein the first storage subsystem is arranged to maintain a further record that is indicative of the locations at the which the data have been updated on the second storage subsystem and have not yet been copied to the first storage subsystem, and
wherein the first storage subsystem is arranged to receive a request from a further host processor to access the data stored at a further location on the data storage system, and if the further location is included in the further record, to send a further message to the second storage requesting a synchronous update of the data at the further location, and to provide the data stored at the further location to the further host processor after receiving the response to the further message from the second storage subsystem.

35. The system according to claim 34, wherein the input from the host processor comprises the data to be written to the given location on the second storage system, and wherein the second storage subsystem is arranged to notify the first storage system in a synchronous message that the data at the given location have been updated if the given location is not included in the further record on the first storage subsystem.

36. The system according to claim 21, wherein the first and second storage subsystems are located at mutually-remote sites and are arranged to communicate over a communication link between the sites.

37. The system according to claim 36, wherein the sites comprise first and second mutually-remote sites, at which the first and second storage subsystems are respectively located, and wherein the host processor from which the request is received at the second storage subsystem is located in proximity to the second site, and the first storage subsystem is arranged to provide the data to a further host processor that is located in proximity to the first site.

38. The system according to claim 21, wherein the first storage subsystem is arranged, upon occurrence of a failure in the second storage subsystem, to provide the data directly to the host processor.

39. The system according to claim 21, wherein the record comprises a bitmap, and wherein the second storage subsystem is arranged to mark respective bits in the bitmap corresponding to the locations that are included in the record.

40. The system according to claim 21, wherein the second storage subsystem comprises a computer workstation having an installable file system running thereon, and wherein the installable file system causes the second storage subsystem to maintain the record and to provide the data to the host processor.

41. A computer software product for use in a data storage system including primary and secondary storage subsystems, which are arranged to store data and include respective first and second control units, the product comprising a computer-readable medium in which program instructions are stored, which instructions, when read by the first and second control units, cause the first control unit to copy the data stored on the first storage subsystem to the second storage subsystem in an asynchronous mirroring process, and wherein the instructions cause the second control unit to maintain a record indicative of locations at which the data have been updated on the first storage subsystem and have not yet been copied to the second storage subsystem, and further cause the second control unit, upon receiving a request from a host processor to access the data stored at a specified location on the data storage system, if the specified location is included in the record, to send a message to the first storage subsystem requesting a synchronous update of the data at the specified location, and to provide the data stored at the specified location to the host processor after receiving a response to the message from the first storage subsystem.

42. The product according to claim 41, wherein the instructions cause the second control unit to provide the data stored at the specified location to the host processor in response to the request without sending the message if the specified location is not included in the record.

43. The product according to claim 41, wherein the instructions cause the second control unit to remove the specified location from the record upon receiving the response from the first storage subsystem.

44. The product according to claim 41, wherein the locations included in the record maintained by the second control unit are a superset of the locations at which the data have been updated on the first storage subsystem and have not yet been copied to the second storage subsystem.

45. The product according to claim 44, wherein the instructions cause the first control unit, upon receiving an update to the data at a given location, to send an instruction to the second storage subsystem, which causes the second control unit to add a plurality of locations, including the given location, to the record.

46. The product according to claim 45, wherein the plurality of the locations to add to the record are selected responsively to a prediction of the locations at which the data are expected to be updated subsequent to updating the data at the given location.

47. The product according to claim 45, wherein the instructions cause the first control unit to maintain a copy of the record, and to determine whether to send the instruction responsively to the copy of the record.

48. The product according to claim 47, wherein the instructions cause the first control unit to send the instruction only if the given location is not included in the record.

49. The product according to claim 47, wherein the instructions cause the first and second control units to remove the specified location from both the record and the copy of the record responsively to receiving the response from the first storage subsystem at the second storage subsystem.

50. The product according to claim 44, wherein the response from the first storage subsystem comprises the data stored at the specified location if the specified location is one of the locations at which the data have been updated on the first storage subsystem and have not yet been copied to the second storage subsystem, and wherein the response otherwise comprises a status notification indicating that the data at the specified location on the second storage subsystem are synchronized with the data on the first storage subsystem.

51. The product according to claim 41, wherein the instructions cause the first control unit to send the response incorporating the data stored at the specified location, and to convey the data from one or more additional locations on the first storage subsystem to the second storage system responsively to the message from the second storage subsystem.

52. The product according to claim 51, wherein the instructions cause the first control unit to select the additional locations predictively based on the request from the host processor to access the data stored at the specified location.

53. The product according to claim 41, wherein the instructions cause the second control unit to update the data that are stored on the second storage subsystem responsively to an input from the host processor, and to copy the updated data to the first storage subsystem in the asynchronous mirroring process.

54. The product according to claim 53, wherein the instructions cause the first control unit to maintain a further record that is indicative of the locations at the which the data have been updated on the second storage subsystem and have not yet been copied to the first storage subsystem, and wherein the instructions further cause the first control unit to receive a request from a further host processor to access the data stored at a further location on the data storage system, and if the further location is included in the further record, to send a further message to the second storage requesting a synchronous update of the data at the further location, and to provide the data stored at the further location to the further host processor after receiving the response to the further message from the second storage subsystem.

55. The product according to claim 54, wherein the input from the host processor comprises the data to be written to the given location on the second storage system, and wherein the instructions cause the second control unit to notify the first storage system in a synchronous message that the data at the given location have been updated if the given location is not included in the further record on the first storage subsystem.

56. The product according to claim 41, wherein the first and second storage subsystems are located at mutually-remote sites and are arranged to communicate over a communication link between the sites.

57. The product according to claim 56, wherein the sites comprise first and second mutually-remote sites, at which the first and second storage subsystems are respectively located, and wherein the host processor from which the request is received at the second storage subsystem is located in proximity to the second site, and the instructions cause the first control unit to provide the data to a further host processor that is located in proximity to the first site.

58. The product according to claim 41, wherein the instructions cause the first control unit, upon occurrence of a failure in the second storage subsystem, to provide the data directly to the host processor.

59. The product according to claim 41, wherein the record comprises a bitmap, and wherein the instructions cause the second control unit to mark respective bits in the bitmap corresponding to the locations that are included in the record.

60. The product according to claim 41, wherein the second storage subsystem comprises a computer workstation, and wherein the product comprises an installable file system, which causes the second control unit to maintain the record and to provide the data to the host processor.

61. A method for managing a data storage system that includes first and second storage subsystems, the method comprising:
    copying data stored on the first storage subsystem to the second storage subsystem in an asynchronous mirroring process;
    maintaining a record on the second storage subsystem, indicative of locations at which the data have been updated on the first storage subsystem and have not yet been copied to the second storage subsystem;
    receiving at the second storage subsystem, from a host processor, a request to access the data stored at a specified location on the data storage system; and
if the specified location is included in the record, initiating a synchronous transfer of the data at the specified location from the first storage subsystem.

62. The method according to claim 61, and comprising providing the data stored at the specified location from the second storage subsystem to the host processor in response to the request without initiating the synchronous transfer if the specified location is not included in the record.

63. A data storage system, comprising first and second storage subsystems, which are arranged to store data,
    wherein the first storage subsystem is arranged to copy the data stored on the first storage subsystem to the second storage subsystem in an asynchronous mirroring process, and
    wherein the second storage subsystem is arranged to maintain a record indicative of locations at which the data have been updated on the first storage subsystem and have not yet been copied to the second storage subsystem, and
    wherein the second storage subsystem is further arranged to receive a request from a host processor to access the data stored at a specified location on the data storage system, and if the specified location is included in the record, to initiate a synchronous transfer of the data at the specified location from the first storage subsystem.

64. The system according to claim 63, wherein the second storage subsystem is arranged to provide the data stored at the specified location to the host processor in response to the request without initiating the synchronous transfer if the specified location is not included in the record.

65. A computer software product for use in a data storage system including primary and secondary storage subsystems, which are arranged to store data and include respective first and second control units, the product comprising a computer-readable medium in which program instructions are stored, which instructions, when read by the first and second control units, cause the first control unit to copy the data stored on the first storage subsystem to the second storage subsystem in an asynchronous mirroring process, and
    wherein the instructions cause the second control unit to maintain a record indicative of locations at which the data have been updated on the first storage subsystem and have not yet been copied to the second storage subsystem, and further cause the second control unit, upon receiving a request from a host processor to access the data stored at a specified location on the data storage system, if the specified location is included in the record, to initiate a synchronous transfer of the data at the specified location from the first storage subsystem.

66. The product according to claim 65, wherein the instructions cause the second control unit to provide the data stored at the specified location to the host processor in response to the request without initiating the synchronous transfer if the specified location is not included in the record.

* * * * *